C. A. MASTERSON.
Hoe and Brier-Hook
No. 202,563. Patented April 16, 1878.
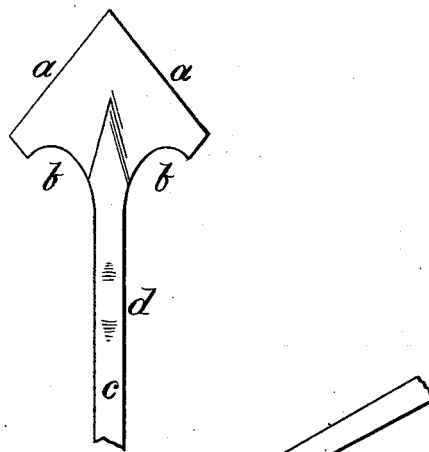
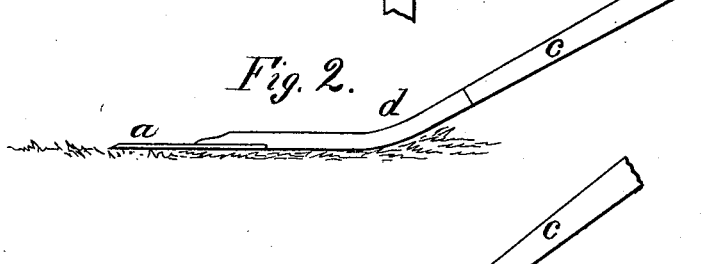
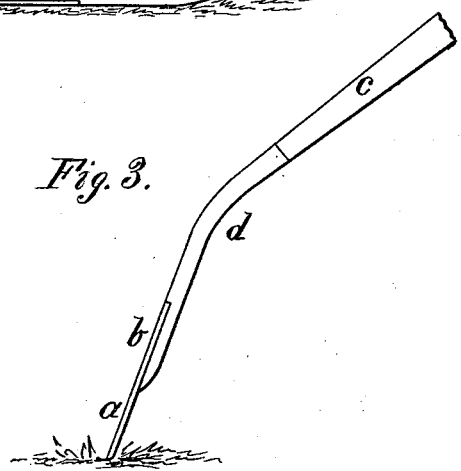
WITNESSES
Villette Anderson.
Geo. C. Poulton.
INVENTOR
C. A. Masterson
by E. W. Anderson
ATTORNEY

UNITED STATES PATENT OFFICE.

CARSON A. MASTERSON, OF DECATUR, ILLINOIS.

IMPROVEMENT IN HOE AND BRIER-HOOK.

Specification forming part of Letters Patent No. 202,563, dated April 16, 1878; application filed July 6, 1877.

*To all whom it may concern:*

Be it known that I, CARSON A. MASTERSON, of the city of Decatur, Macon county, and State of Illinois, have invented a new and useful Hoe and Brier-Hook Combined, of which the following is a specification:

I term my invention a "reversible thrust-hoe and double brier-hook combined," and construct it as hereinafter shown and described.

Figure 1 of the drawings shows a plan of the hoe, giving outline as proportioned. Fig. 2 shows the device operated as a thrust or weeding hoe, and Fig. 3 shows the same reversed and used for digging.

$a\ a$ represent the cutting-edges of the hoe; $b\ b$, the hooks used for briers, and $c$ the handle, extending back on a line with the lower surface of the hoe-blade, and forming a curved angle at $d$, substantially as shown. The object attained by the peculiar shape of the handle is a heel or fulcrum, by means of which the point of the instrument may be readily elevated or depressed, and the direction of the same accurately controlled; and, also, in reversing, as shown, the angle brings the hoe in the proper position for digging.

For weeding or light cultivation, the hoe is placed on the ground horizontally, and a slight pressure given without changing the inclination. The hoe is then moved forward and back alternately, making the forward stroke the longest, or moved directly forward in the manner of a plow. In the backward movement the rear edges, being well sharpened, are of great utility.

For digging, the instrument is reversed, as in Fig. 3, and thrust into the ground with a short chopping motion, the operator walking backward, as in spading.

The hooks $b\ b$ are passed around the briers and operated by a pulling motion. The shape of the hoe is of utility in forcing it into a brier-heap.

I claim—

A combined hoe, digger, and brier-cutter, consisting of a flat blade having converging edges $a\ a$ in front, and the curved cutting-edges $b\ b$ at the rear, in combination with the handle $d$, having a curved angle, forming a heel or fulcrum, by means of which the blade of the instrument may be readily elevated or depressed when employed as a hoe, and brought into proper position for digging when reversed, substantially as specified.

CARSON A. MASTERSON.

Witnesses:
LEVI P. GRAHAM,
CHAS. F. CHAPMAN.